(12) United States Patent
Sauder et al.

(10) Patent No.: US 9,629,306 B2
(45) Date of Patent: Apr. 25, 2017

(54) PLOT PLACEMENT SYSTEMS AND METHODS

(71) Applicant: PRECISION PLANTING LLC, Tremont, IL (US)

(72) Inventors: Derek Sauder, Tremont, IL (US); Doug Sauder, Livermore, CA (US); Phil Baurer, Tremont, IL (US); Timothy Sauder, Tremont, IL (US)

(73) Assignee: The Climate Corporation, San Francisco, CA (US)

( * ) Notice: Subject to any disclaimer, the term of this patent is extended or adjusted under 35 U.S.C. 154(b) by 0 days.

(21) Appl. No.: 14/653,150

(22) PCT Filed: Dec. 16, 2013

(86) PCT No.: PCT/US2013/075404
§ 371 (c)(1),
(2) Date: Jun. 17, 2015

(87) PCT Pub. No.: WO2014/099791
PCT Pub. Date: Jun. 26, 2014

(65) Prior Publication Data
US 2015/0359167 A1 Dec. 17, 2015

Related U.S. Application Data

(60) Provisional application No. 61/738,259, filed on Dec. 17, 2012.

(51) Int. Cl.
*A01C 21/00* (2006.01)
*A01B 79/00* (2006.01)

(52) U.S. Cl.
CPC .......... *A01C 21/005* (2013.01); *A01B 79/005* (2013.01); *A01C 21/00* (2013.01)

(58) Field of Classification Search
CPC ..... B05B 1/3046; B05B 1/304; B05B 1/3033; B05B 1/30; B05B 1/00; A01C 23/024; A01C 23/023; A01C 23/02; A01C 23/00; A01C 21/005; A01C 21/00; A01B 79/005; A01B 79/00
See application file for complete search history.

(56) References Cited

U.S. PATENT DOCUMENTS

| 4,163,507 A | 8/1979 | Bell |
| 5,915,313 A | 6/1999 | Bender et al. |

(Continued)

FOREIGN PATENT DOCUMENTS

| WO | 9821929 A1 | 5/1998 |
| WO | 9842178 A1 | 10/1998 |

(Continued)

OTHER PUBLICATIONS

European Search Report, issued Jun. 21, 2016, pp. 1-7.

*Primary Examiner* — Christopher J Novosad
(74) *Attorney, Agent, or Firm* — Hickman Palermo Becker Bingham LLP

(57) ABSTRACT

Systems and methods for implementing a plot in a field based on the location of a marker placed in an application prescription map prior to a crop input application operation. The plot defines a plot region. The plot region is defined during the crop input application operation based on the marker location.

15 Claims, 13 Drawing Sheets

(56) References Cited

U.S. PATENT DOCUMENTS

| | | | |
|---|---|---|---|
| 6,070,538 A * | 6/2000 | Flamme | A01B 79/005 |
| | | | 111/170 |
| 6,122,581 A | 9/2000 | McQuinn | |
| 7,418,908 B2 | 9/2008 | Landphair et al. | |
| 8,151,718 B2 | 4/2012 | Mariman et al. | |
| 2012/0050023 A1 | 3/2012 | Sauder et al. | |

FOREIGN PATENT DOCUMENTS

| | | | | |
|---|---|---|---|---|
| WO | 2012015957 A1 | 2/2012 | | |
| WO | WO2012015957 A1 * | 2/2012 | | H04L 5/001 |
| WO | 2012174134 A1 | 12/2012 | | |

\* cited by examiner

PLOT PLACEMENT SYSTEMS AND METHODS

BACKGROUND

In recent years, farmers and agronomists have increasingly recognized the importance of population (i.e., the number of seeds planted per acre) in maximizing yield and profit in the cultivation of corn and other crops. There is similar interest in maximizing the economic benefit of other crop inputs such as nitrogen. Thus, there is a need in the art for systems and methods for varying crop input application rates.

DESCRIPTION

Figure 1:
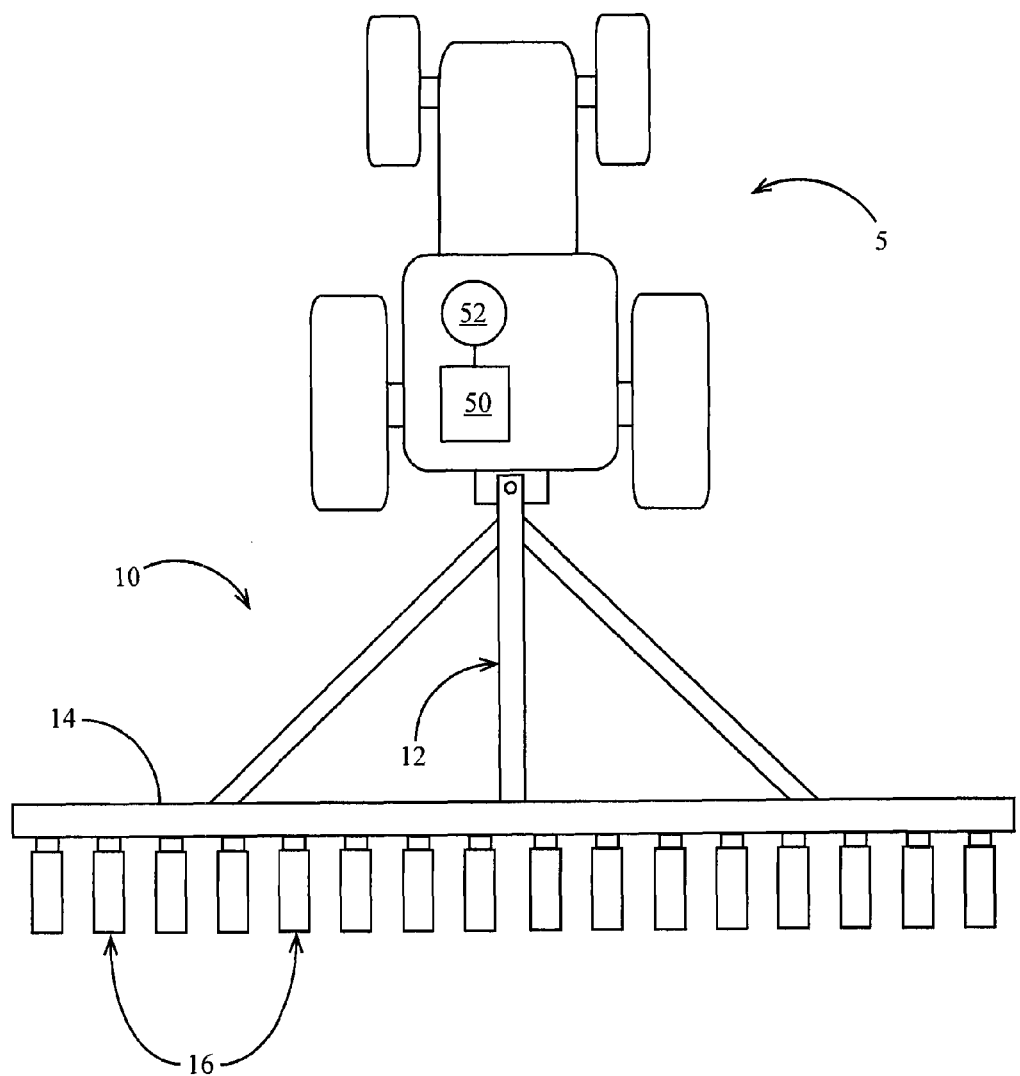
FIG. 1 is a top view of an embodiment of a row crop planter.

Referring now to the drawings, wherein like reference numerals designate identical or corresponding parts throughout the several views, FIG. 1 illustrates a top view of a tractor 5 pulling a planter 10 used to plant row crops. The planter 10 includes a frame 12, in which a toolbar 14 extends transversely as a mounting structure for row units 16, each of which is configured to plant seeds in a row as is known in the art. Each row unit 16 is preferably configured to plant at variable population rates (i.e., number of seeds per acre) as is disclosed in U.S. Pat. No. 6,863,006, the disclosure of which is hereby incorporated herein in its entirety by reference.

Application Control and Monitoring System

Figure 2:
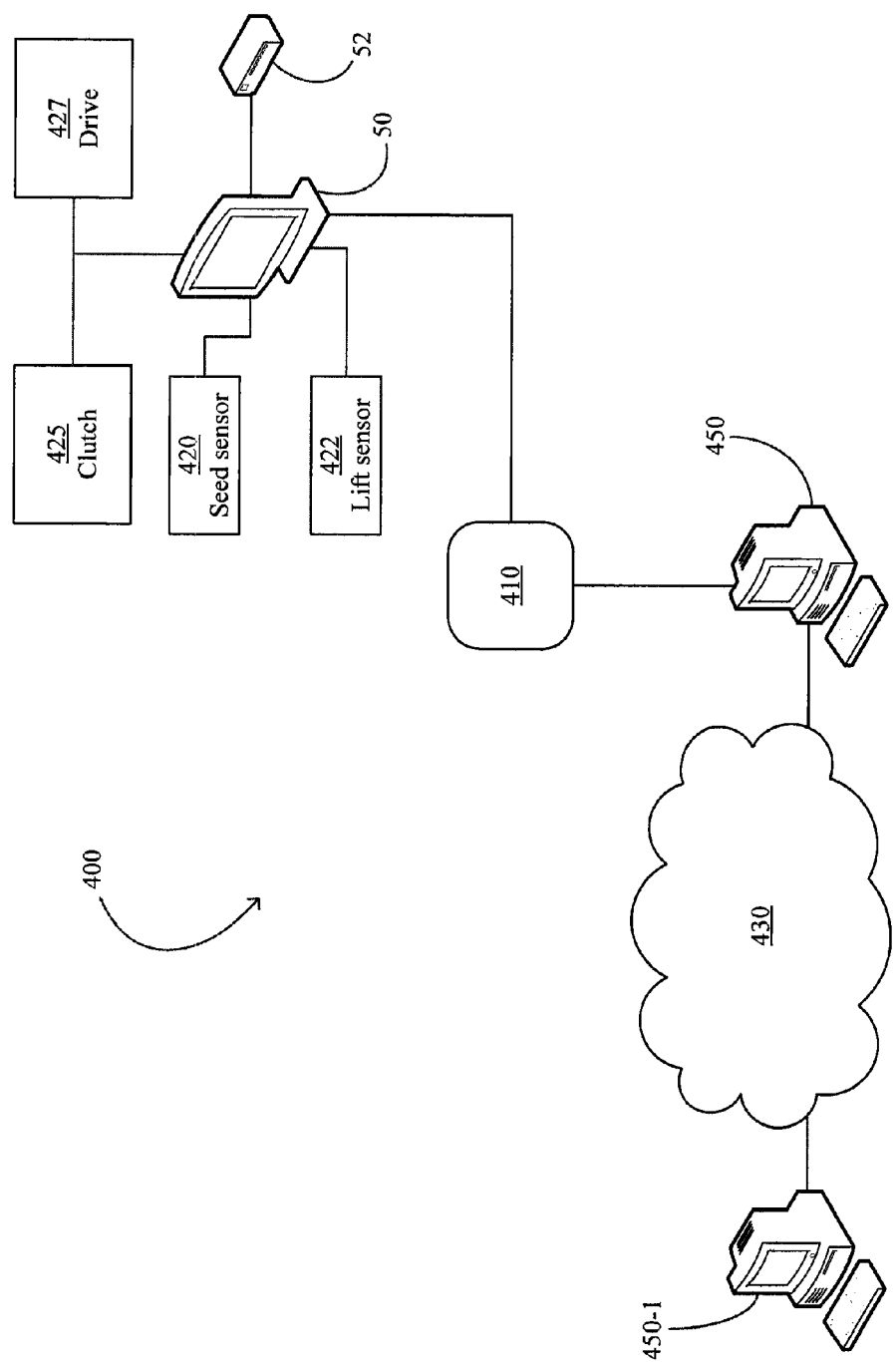
FIG. 2 schematically illustrates an embodiment of a system for controlling a planter and gathering planting data.

The planter 10 preferably includes one or more drives 427 (FIG. 2), such as hydraulic or electric drives as are known in the art, for varying the population rate planted by each row unit 16 or a group of row units. The planter 10 further preferably includes one or more clutches 425 (FIG. 2) for engaging and disengaging the drives to stop or resume planting at each row unit 16 or group of row units. The planter 10 further preferably includes one or more seed sensors 420 (FIG. 2) for detecting the time of seed deposition as well as the population rate planted by each row unit 16. The population rate is preferably controlled by a planter monitor 50, which is preferably mounted in a cab of the tractor and preferably includes a memory, a processor and a graphical user interface. The planter monitor 50 may be a monitor such as that disclosed in Applicant's co-pending U.S. application Ser. No. 13/292,384 (Publication No. US2012/0050023), the disclosure of which is hereby incorporated herein in its entirety by reference. The planter monitor 50 is preferably configured to allow a user to enter plot placement parameters as disclosed in Applicant's co-pending International Patent Application No. PCT/US2012/042281, the disclosure of which is hereby incorporated herein in its entirety by reference. A global positioning system ("GPS") receiver 52 is preferably mounted to the tractor and in electrical communication with the monitor 50 for transmitting the current global location of the tractor 5 to the monitor 50. In other embodiments, the GPS receiver 52 may be mounted to the toolbar 14.

In operation, the monitor 50 may be provided with a prescription map file indicating the population rate to be planted at each global location in a field. As the planter traverses the field, the monitor 50 commands the row units 16 to plant at the population rate corresponding to the global location currently indicated by the GPS receiver 52. Simultaneously, the seed sensors 420 report the deposition of each seed to the monitor 50 and the monitor preferably records the location of each seed and calculates the actual prescription rate for each location in the field.

A system 400 for gathering, comparing and analyzing planting and yield data obtained as described above is illustrated in FIG. 2. The planter GPS receiver 52 is in electrical communication with the monitor 50. The monitor 50 is preferably in electrical communication with one or more clutches 425, drives 427, and seed sensors 420. Each clutch 425 is operably coupled to one or more row units 16 and configured to stop each row unit from seeding based on a command signal received from the monitor 50. Each drive 427 is operably coupled to one or more row units 16 (e.g., to a seed meter of the row unit) and configured to vary the application rate of each row unit associated with the drive 427 based on a signal received from the monitor 50. The drives 427 preferably comprise electric motor drives mounted to each row unit as disclosed in Applicant's co-pending U.S. Provisional Patent Application No. 61/675,714, the disclosure of which is hereby incorporated herein in its entirety by reference; however, in other embodiments each drive 427 is configured to drive a shaft mechanically coupled to seed meters on multiple row units as disclosed in U.S. Pat. No. 8,151,718, the disclosure of which is hereby incorporated herein in its entirety by reference. Each seed sensor 420 is preferably mounted to one of the row units 16 (e.g., to a seed tube of the row unit) and configured to generate a signal indicating the deposition of a seed by the row unit 16. The seed sensors 420 preferably comprise optical sensors such as those disclosed in U.S. Pat. No. 4,163,507, the disclosure of which is hereby incorporated herein in its entirety by reference.

A lift sensor 422 is preferably coupled to the planter 10 (e.g., to a lift wheel assembly configured to lift the toolbar 14), or, in other embodiments, to the tractor 5 (e.g., to a three-point hitch of the tractor) and configured to generate a modified signal when the planter 10 is lifted. The lift sensor 422 is preferably in electrical communication with the monitor 50. In some embodiments, the lift sensor 422 comprises an implement lift switch such as those available from Dickey-John corporation in Auburn, Ill.

The monitor 50 preferably communicates data to a computer 450 preferably having a processor, memory and graphical user interface via one or more data transfer devices 410 (e.g., a USB memory or a modem). The computer 450 is preferably configured to match planting data to yield data for each location in the field and to perform analysis of the same data. In other embodiments, the functions performed herein by the computer 450 are performed by the monitor 50, eliminating the necessity of any data transfer device 410.

In some embodiments, the computer 450 is also in data communication (as, for example, by an Internet connection) with a server 430. In such embodiments, the computer 450 and other computers 450-1 operated by other users may transmit planting and harvesting data to the server 430. The same data are preferably retrieved by the computer 450 for use in comparing results among fields.

Marker Placement and Plot Implementation

Figure 3:
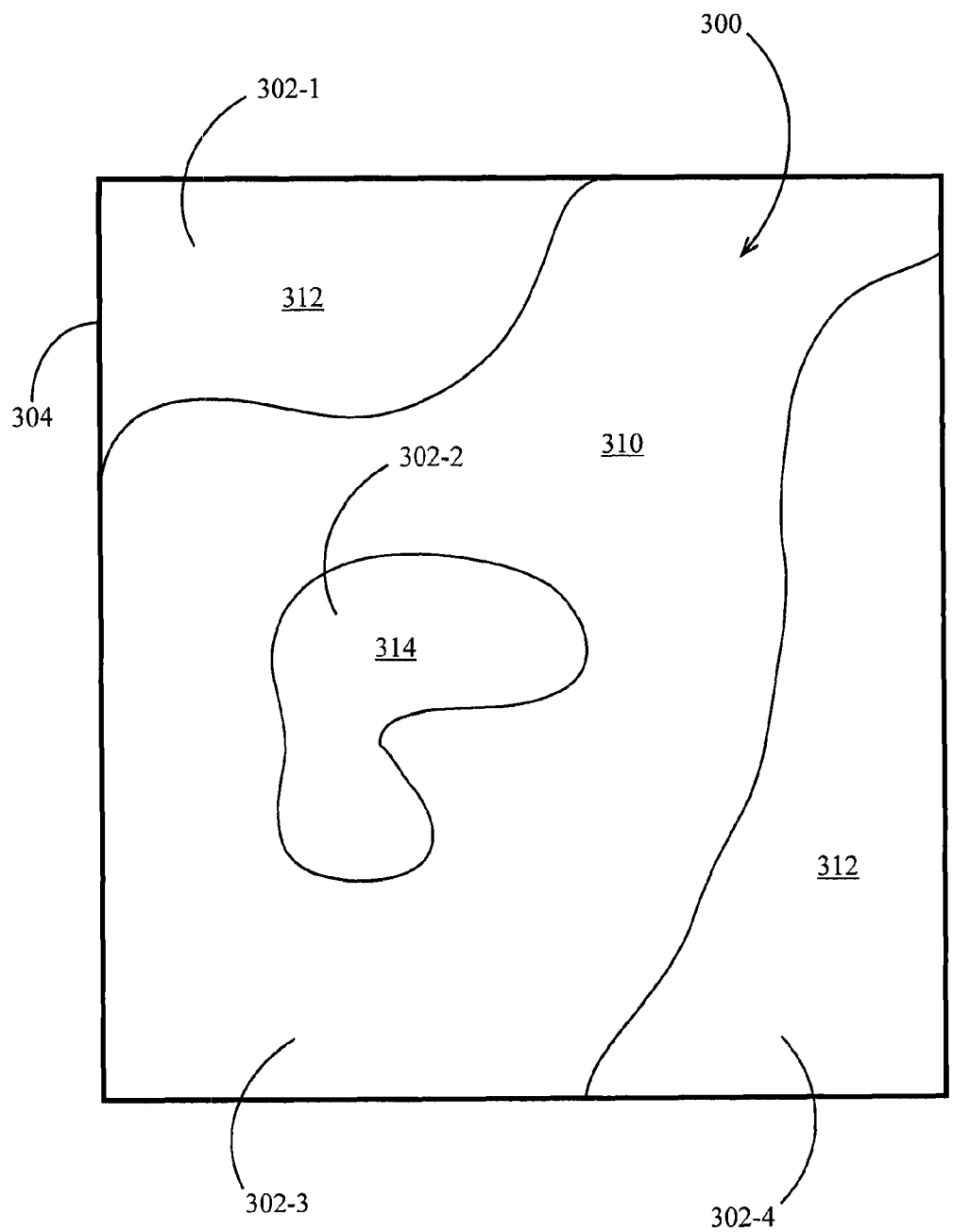
FIG. 3 illustrated an embodiment of a prescription map.
Figure 7:
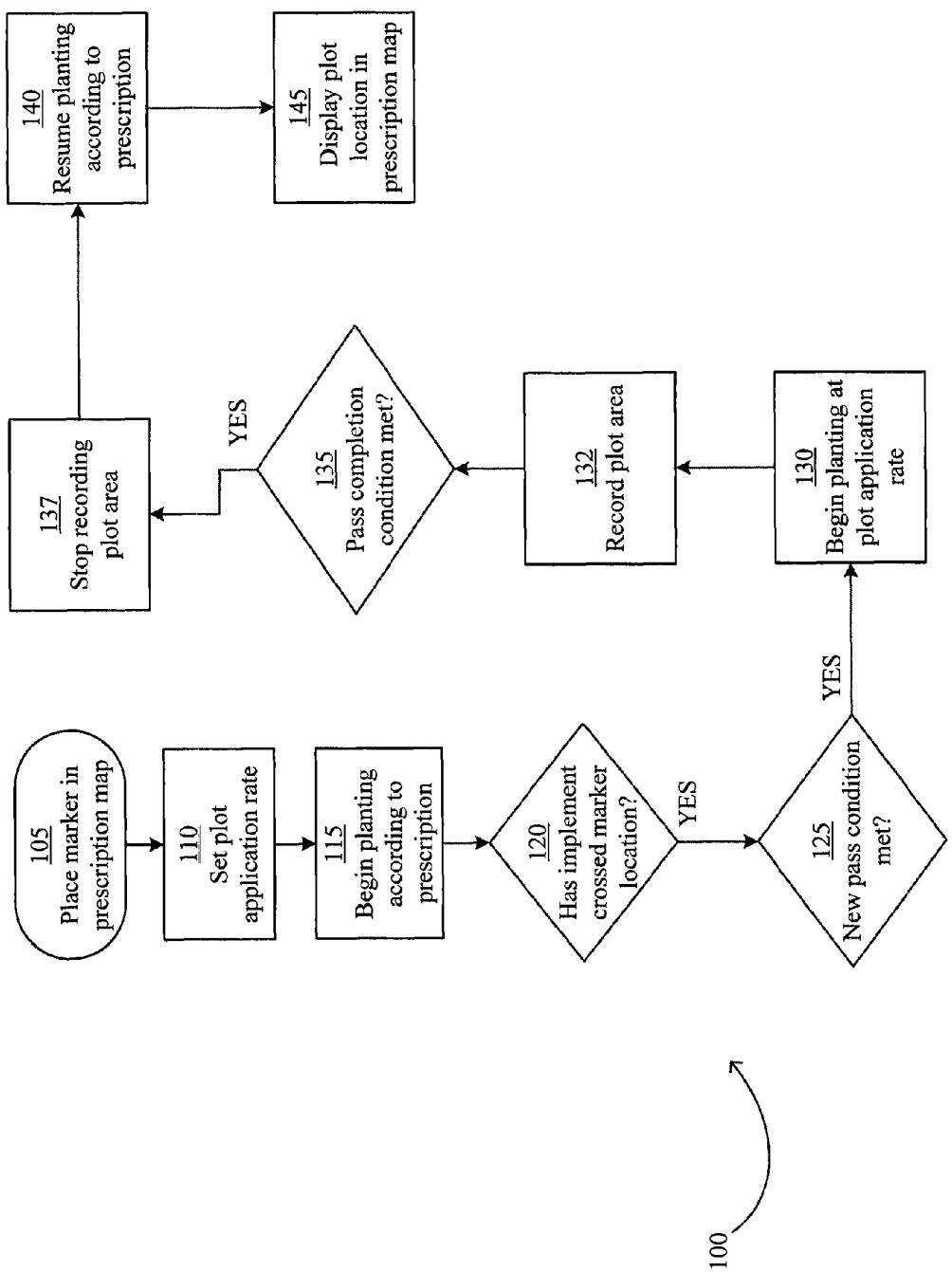
FIG. 7 illustrates an embodiment of a process for implementing a plot.

Turning to FIG. 7, a process 100 for implementing a plot, preferably using the system 400, is illustrated. At step 105, the user preferably uses the computer 450 or the monitor 50 to place a marker on a prescription map, as may be performed as described herein in reference to FIGS. 3 and 4. Referring to FIG. 3, a prescription map 300 is illustrated comprising several regions 302 within a field boundary 304. The prescription map 300 preferably corresponds to a file, e.g., a shape file, stored in the memory of the monitor 50 and/or the computer 450. Each region 302 preferably comprises a polygon comprising a set of geo-referenced locations (e.g., GPS vertices) within a field 600 (FIG. 5). Each region 302 is preferably associated with an application rate stored in the memory of the monitor 50 and/or the computer 450. By way of illustration, the regions 302-1, 302-2, 302-3, 302-4 are associated with application rates 312, 314, 310, 312 respectively.

Figure 4:
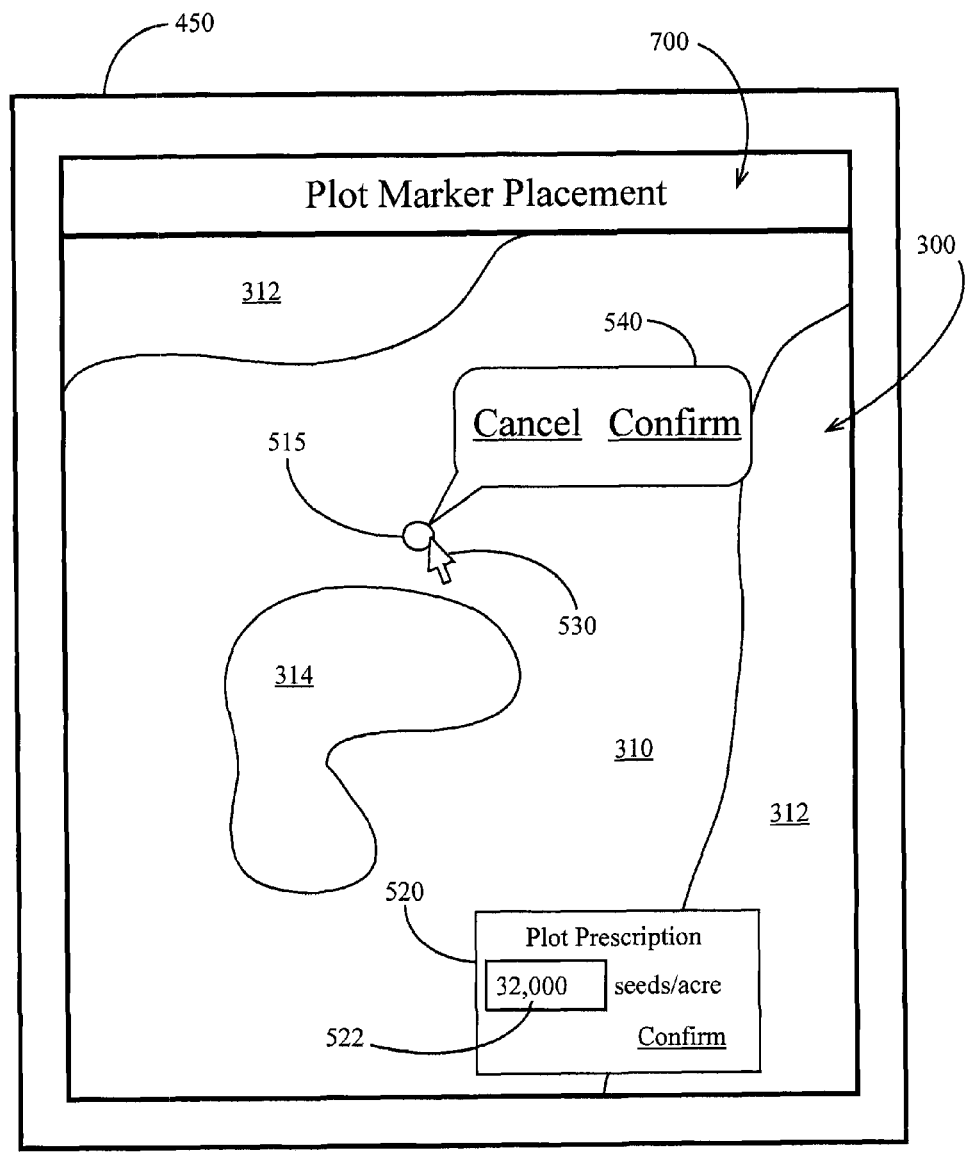
FIG. 4 illustrated an embodiment of a plot marker placement screen.
Figure 5:
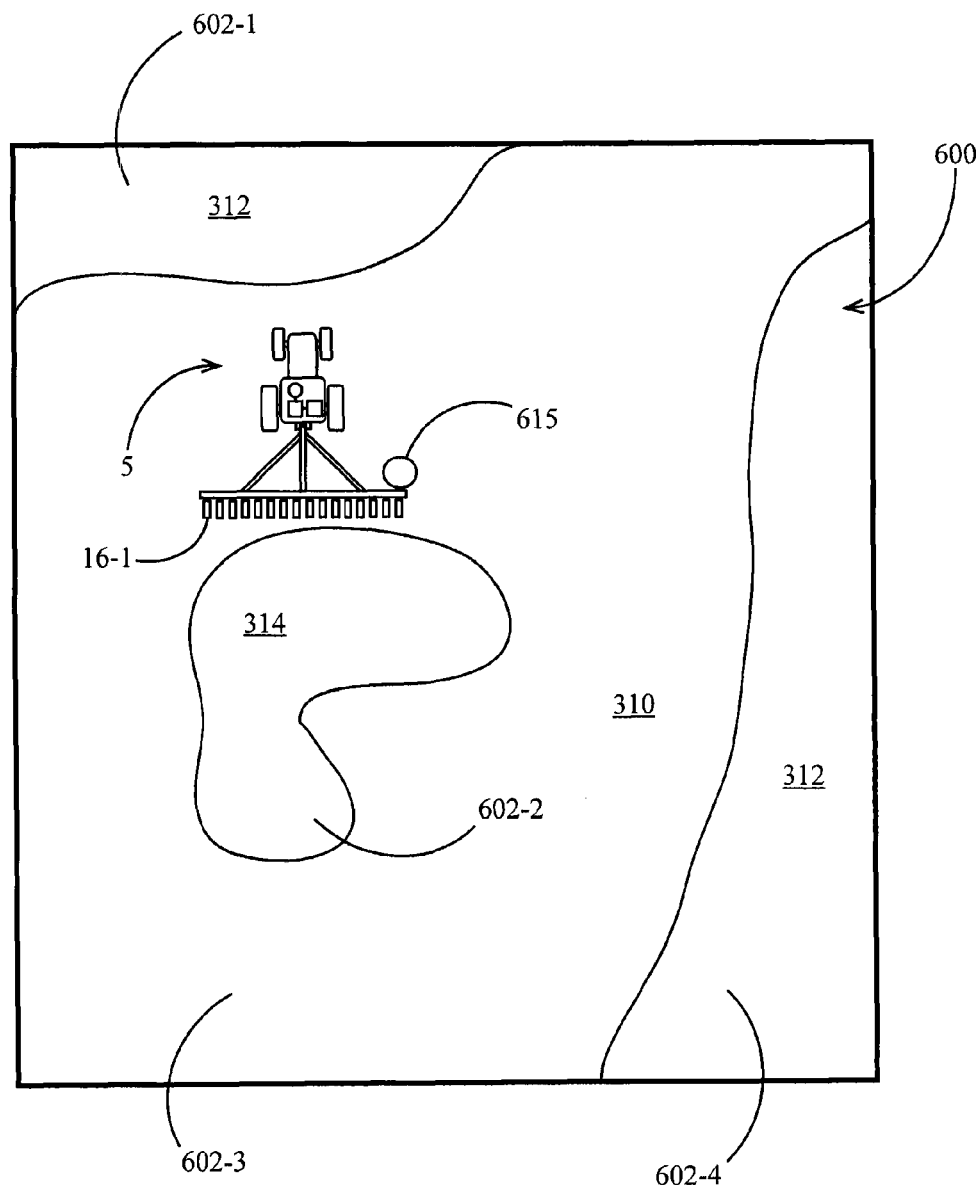
FIG. 5 illustrates the planter of FIG. 1 planting a field according to the prescription map of FIG. 3.

Referring to FIG. 4, the prescription map 300 is displayed on a plot marker placement screen 700 displayed by the computer 450 or monitor 50. The regions 302 of the prescription map 300 are preferably color-coded according to their application rate with colors corresponding to ranges of a legend (not shown) also preferably displayed by the computer 450 or monitor 50. The user preferably uses an interface tool 530 (e.g., a cursor controlled by a mouse, or via a touch screen) to place a marker 515 on the prescription map 300. When the user places the marker 515 (e.g., by clicking on or selecting a location on the prescription map 300), the computer 450 preferably displays a confirmation dialog 540 allowing the user to confirm or cancel the placement of the marker 515. Although in FIG. 4 the marker 515 comprises a symbol indicating a single location at which the marker has been placed, in other embodiments the marker 515 comprises an area selected by the user.

Returning to FIG. 7, at step 110 the computer 450 or the monitor 50 preferably allows the user to set a plot application rate. Referring to FIG. 4, the user has confirmed the placement of marker 515, the computer 450 preferably displays a plot prescription dialog 520 allowing the user to enter and confirm a plot application rate 522 to associate with a plot to be created based on the location of marker 515.

Referring again to FIG. 7, at step 115 the planter 10 preferably begins planting a according to the prescription map 300. Turning to FIG. 5, the planter 10 is illustrated planting a field 600. Regions 602 within the field 600 correspond to regions 302 in the prescription map 300 having like suffixes (see FIG. 3). Thus, as the planter traverses the field 600, the monitor 50 preferably uses a signal generated by the GPS receiver 52 to determine the location of each row unit 16 and commands the drive 427 associated with each row unit 16 to plant at the application rate associated with the prescription map region 302 corresponding to the field region 602 in which the row unit 16 is located. By way of example, at the position of the planter 10 in FIG. 5, the monitor 50 preferably determines that the row unit 16-1 is in the field region 602-3 corresponding to the prescription map region 302-3, and thus commands the drive 427 associated with the row unit 16-1 to plant at application rate 310 (e.g., 30,000 seeds per acre).

Returning to FIG. 7, at step 120 the monitor 50 preferably determines whether the planter 10 has crossed a field marker location 615 corresponding to the location of the marker 515 placed on the prescription map 300 (e.g., by determining whether a non-zero union exists between the marker location and a rectangle having a width scaled to the width of the toolbar 14 and centered on a transverse centerline of the tractor 5). In some embodiments, at step 120 the monitor 50 determines whether the GPS receiver 52 (or the planter 10) is within a threshold distance of the marker 515. Once the planter 10 has crossed the field marker location 615, at step 125 the monitor 50 preferably determines whether the planter 10 has begun a new pass, preferably by determining whether one or more new pass conditions have been met according to a process 200 described herein with respect to FIG. 8. In FIG. 5, the planter is illustrated crossing the marker location 615; in FIG. 6, the planter is illustrated executing a turn outside the field at a position P2 and beginning a new pass at a position P3.

Referring again to FIG. 7, once the planter 10 has begun a new pass after crossing the marker location 615, at step 130 the monitor 50 preferably commands the drives 427 to plant at the plot application rate 522. At step 132 the monitor 50 preferably records the GPS vertices of the plot area 670 while planting the plot area 670, e.g., by recording the area passed over by the toolbar 14 within the field 600. At step 135, the monitor 50 preferably determines whether the pass has been completed, preferably by determining whether one or more plot completion conditions have been met according to a process 250 described herein with respect to FIG. 9. In other embodiments, step 135 is carried out using the same process 200 used to determine whether a new pass has begun.

Figure 6:
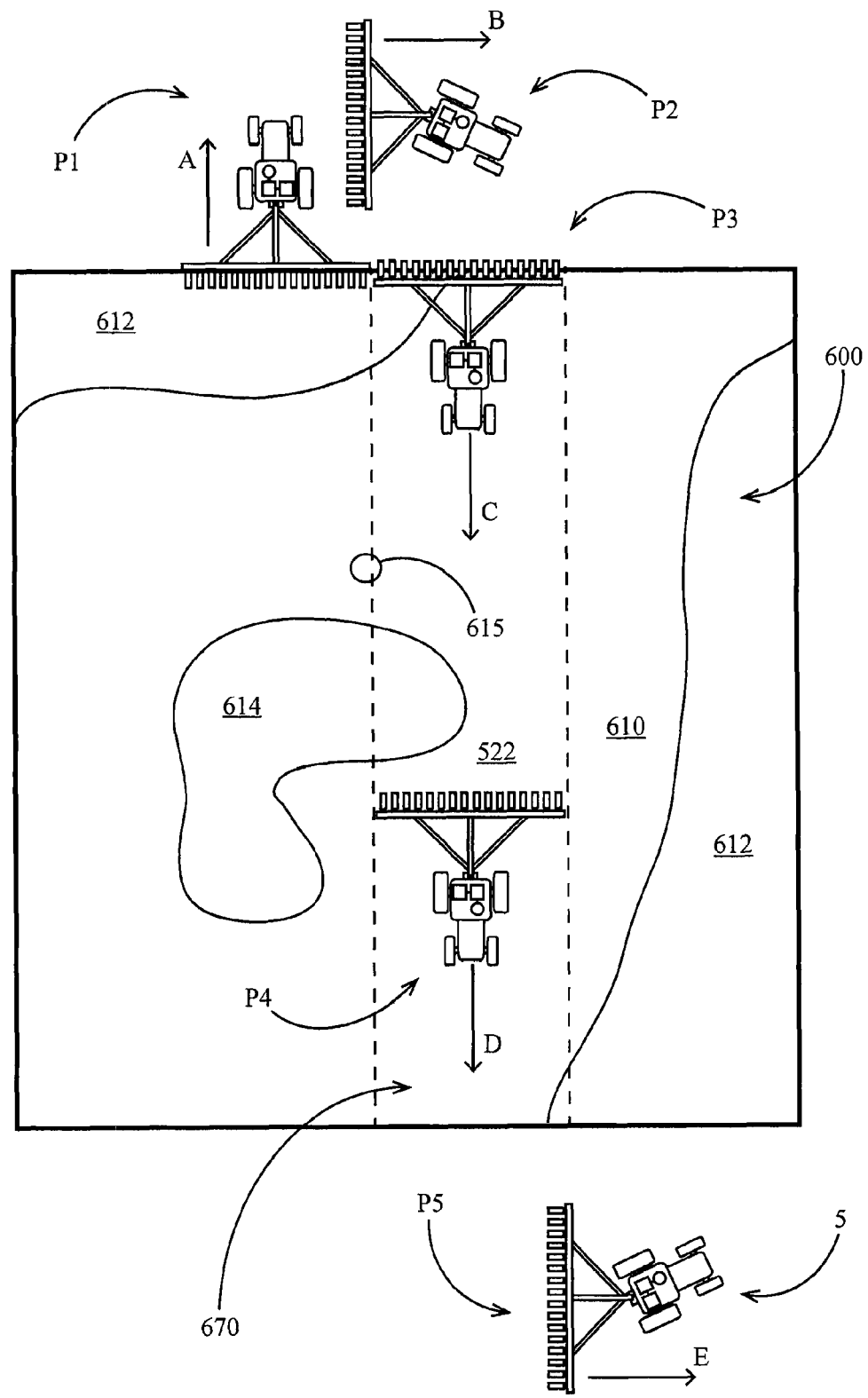
FIG. 6 illustrates the planter of FIG. 1 implementing a plot based on a plot marker placed as illustrated in FIG. 4.

Turning to FIG. 6, as the pass is completed the planter 10 plants a plot area 670 at the plot application rate 522. It should be appreciated that in planting at the plot application rate 522 within the plot area 670, the monitor 50 disregards the prescription map 300.

Figure 10:
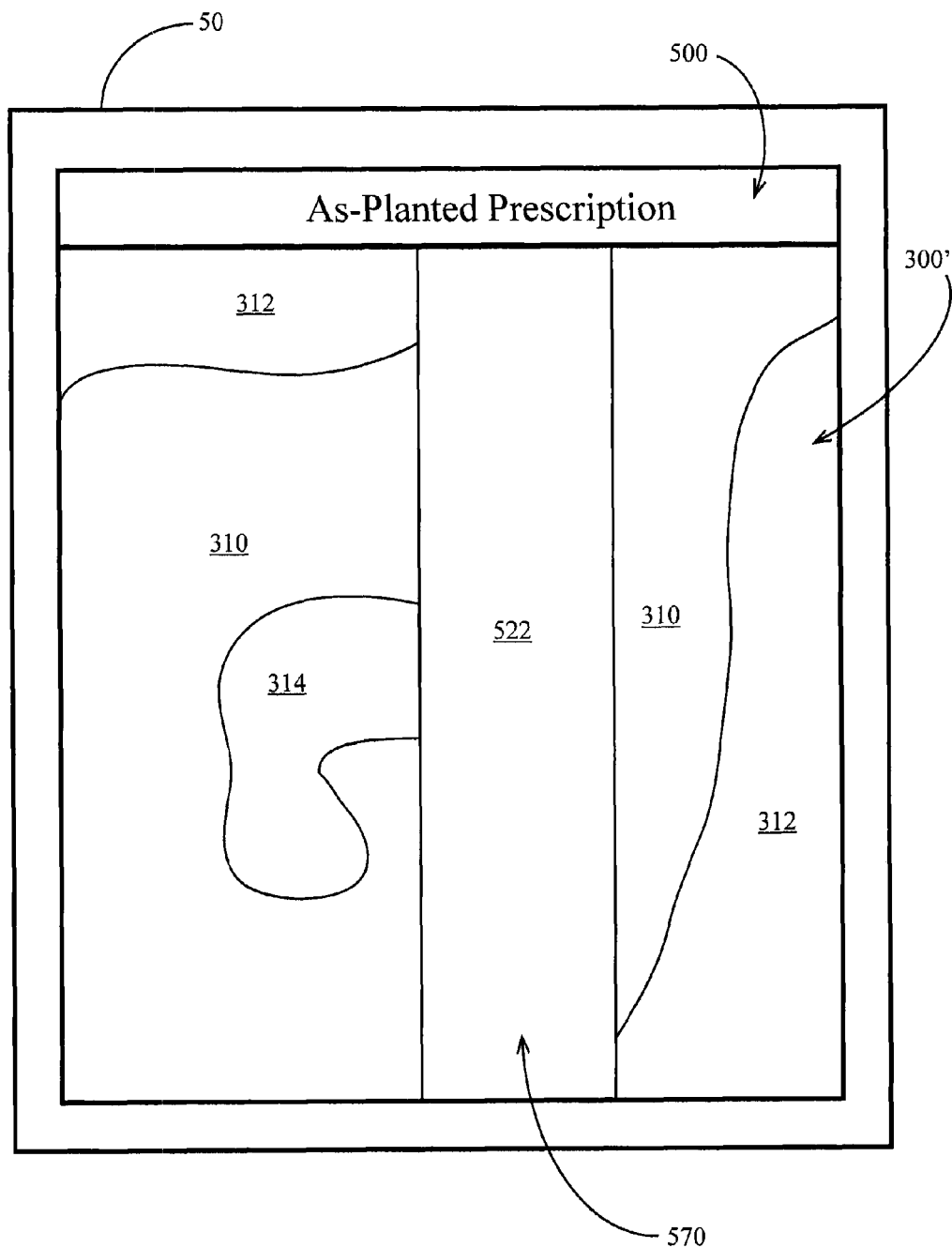
FIG. 10 illustrates an embodiment of an as-planted prescription screen.

Once the pass has been completed at step 135, the monitor 50 preferably stops recording the plot area at step 137 and preferably resumes planting according to the prescription map 300 at step 140. At step 145, the monitor 50 preferably displays an as-planted prescription map 300', e.g., on an as-planted prescription screen 500 as illustrated in FIG. 10. The as-planted prescription map 300' includes a plot area 570 corresponding to the plot area 670 planted at the plot application rate 522. It should be appreciated that the plot area 570 includes locations that were occupied by other regions 302 in the original prescription map 300.

Figure 8:
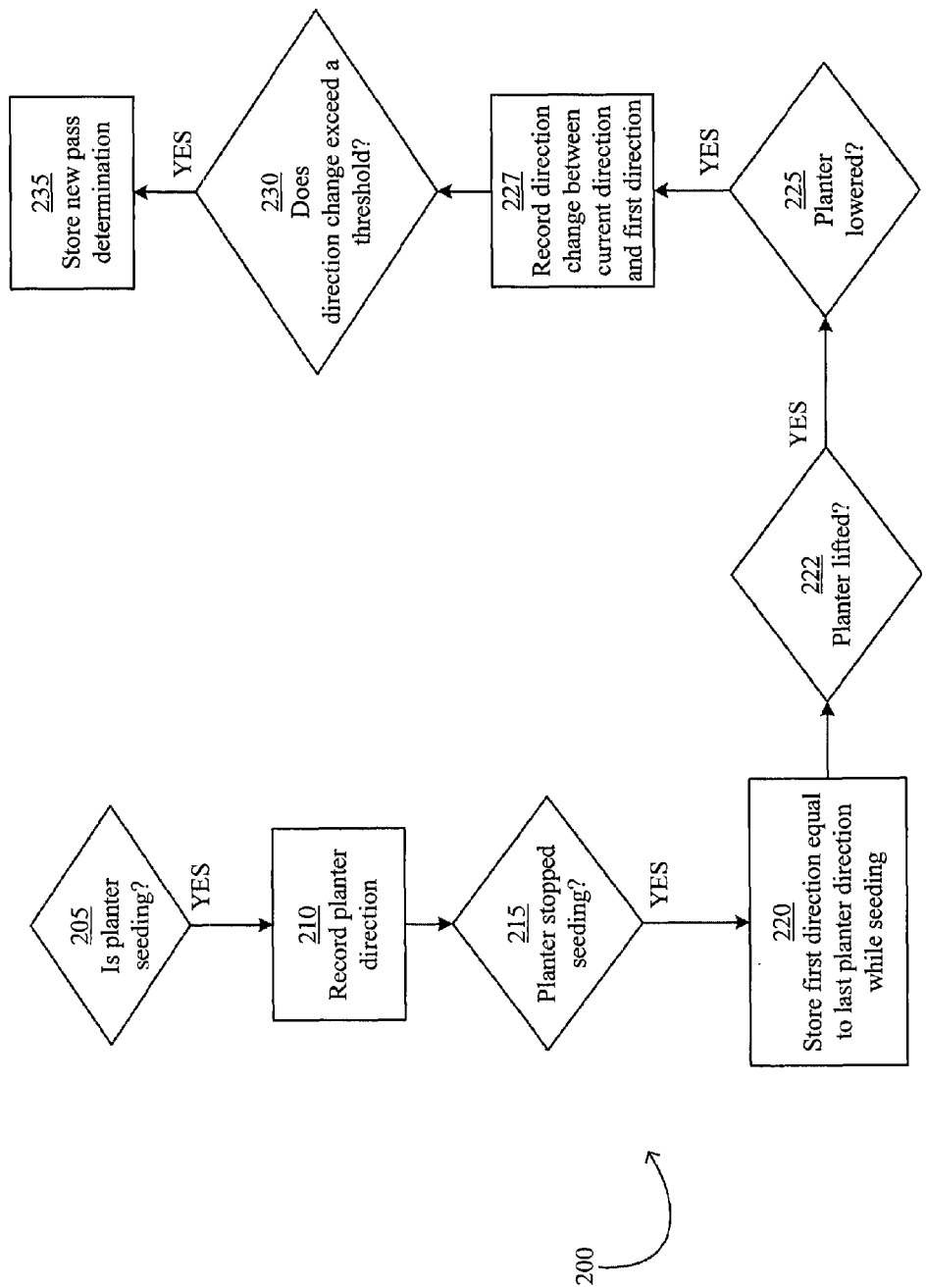
FIG. 8 illustrates an embodiment of a process for determining whether a new pass has begun.

A preferred process 200 for determining whether a new pass has begun is illustrated in FIG. 8. At step 205, the monitor 50 determines whether the planter 10 is seeding, preferably by determining whether a seed pulse has been received over a threshold period from any of the seed sensors 420 associated with the row units 16. If the planter 10 is seeding, then at step 210 the monitor 50 preferably records the planter direction. Where a direction of the planter is determined herein, this step is preferably accomplished by comparing sequential positions reported by the GPS receiver 52; it should be appreciated that the orientation of the planter is most easily determined if the GPS receiver 52 is mounted to the planter (e.g., on the toolbar 14), but in embodiments in which the GPS receiver 52 is mounted to the tractor, the monitor 50 preferably either assumes the planter direction is equal to the tractor direction or estimates a planter direction based on the tractor path. At step 215, the monitor 50 preferably determines whether the planter has stopped seeding; this step is preferably carried out similarly to step 205 but with opposite logic. Once the planter has stopped seeding, at step 220 the monitor 50 preferably records the last recorded planter direction while the planter was seeding (e.g., direction A of the planter at position P1 in FIG. 6). In some embodiments, the last recorded planter direction recorded at step 220 comprises an average value recorded over a predetermined distance (e.g., 35 feet) or during a predetermined time (e.g., 5 seconds) prior to the time at which the planter stopped seeding.

Continuing to refer to FIG. 8, at step 222 the monitor 50 preferably determines whether the planter is in a lifted position. Where the monitor 50 determines raised or lowered position of the planter herein, this step is preferably accomplished by comparing a signal generated by the lift sensor 422 to a threshold signal; in other embodiments, the monitor 50 commands one or more actuators to raise or lower the planter and determines that the planter has been raised or lowered, respectively, immediately after the command has been sent or after a threshold delay after the command has been sent. Once the planter has been lifted, at step 225 the monitor 50 preferably determines whether the planter has been lowered, preferably by a process similar to step 222 but with opposite logic. Once the planter has been lowered, at step 227 the monitor 50 preferably begins to monitor a direction change representing the difference (e.g., in degrees) between the current planter direction (e.g., direction B at position P2 in FIG. 6) and the first direction stored at step 220 (e.g., direction A at position P1 in FIG. 6). At step 230, the monitor 50 preferably determines whether the direction change exceeds a threshold (e.g., 150 degrees). Once the direction change has exceeded the threshold, at step 235 the monitor 50 preferably determines that a new pass has been started, e.g., by storing a value used by process 100 to determine that a new pass condition has been met at step 125.

Figure 9:
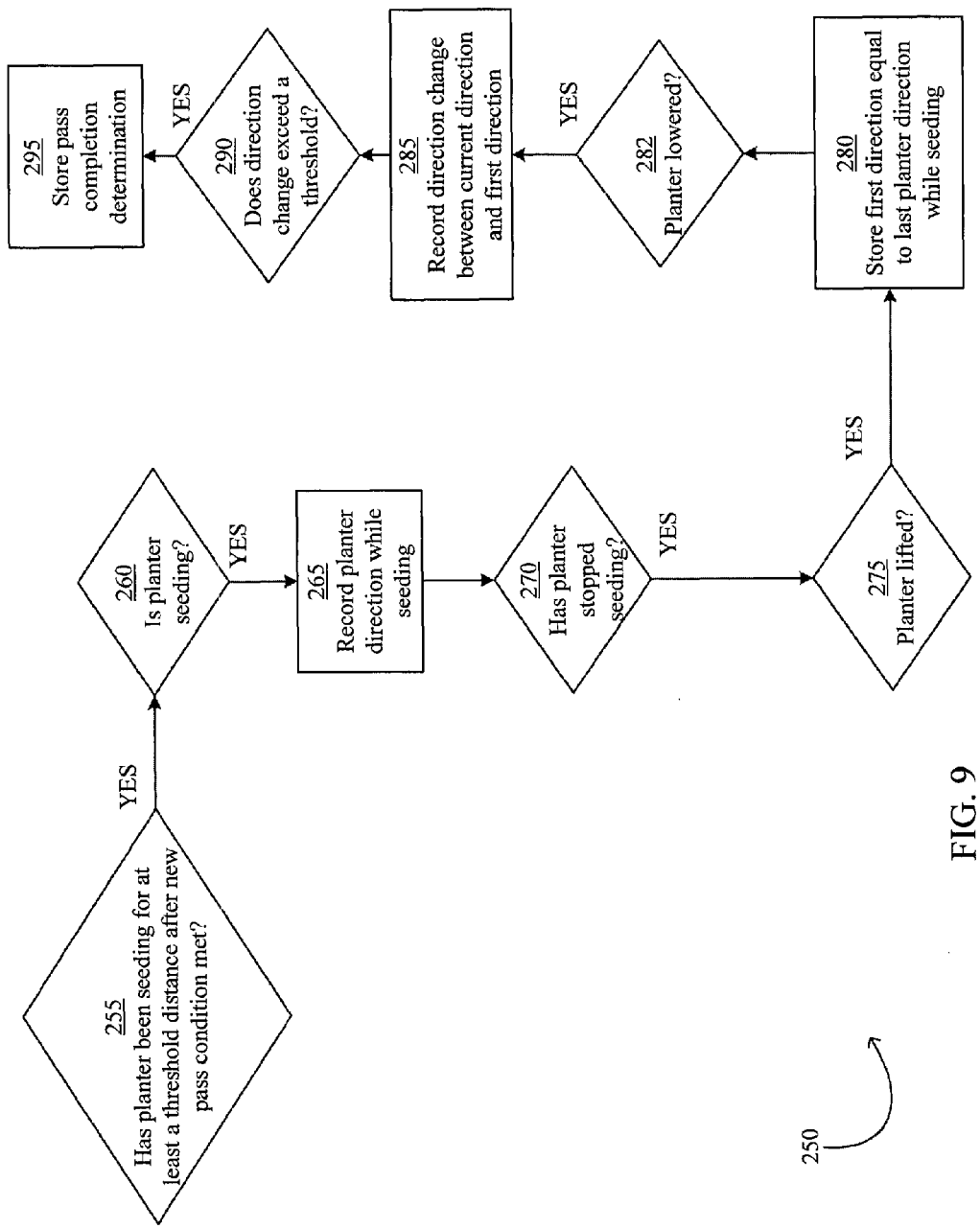
FIG. 9 illustrates an embodiment of a process for determining whether a pass has been completed.

A preferred process 250 for determining whether a pass has been completed is illustrated in FIG. 9. At step 255, the monitor 50 determines whether the planter 10 has been seeding over a threshold distance, preferably by storing a time period bounded by a first time and a second time during which the planter is seeding and comparing a first position reported by the GPS receiver 52 at the first time to a second position reported by the GPS receiver at the second time. In some embodiments the threshold distance used in step 255 comprises a value pre-loaded in memory of the monitor 50 or entered by the user after placing the marker 515. In other embodiments, the monitor 50 determines the threshold distance by determining the likely planter direction when crossing the marker 515 (e.g., using a user-provided indication of likely direction or by accessing a file of recorded GPS coordinates recorded during prior field operations) and then measures a distance between the marker 515 and a field boundary or inner headland boundary along the determined likely planter direction. If the planter 10 has been seeding over the threshold distance, then at step 260 the monitor 50 preferably confirms that the planter is still seeding. If the planter is still seeding, then at step 265 the monitor 50 preferably records the planter direction (e.g., direction D at position P4 in FIG. 6). At step 270, the monitor 50 preferably determines whether the planter has stopped seeding; this step is preferably carried out similarly to step 260 but with opposite logic. Once the planter has stopped seeding, at step 275 the monitor 50 preferably determines whether the planter is in a lifted position.

Continuing to refer to FIG. 9, once the planter has been lifted, at step 280 the monitor 50 preferably determines and records a first direction equal to the last recorded planter direction while the planter was seeding. At step 282, the monitor 50 preferably determines whether the planter is in a lowered position. If the planter is lowered, at step 285 the monitor 50 preferably begins to monitor a direction change representing the difference (e.g., in degrees) between the current planter direction (e.g., direction E at position P5 in FIG. 6) and the first direction stored at step 275. At step 290, the monitor 50 preferably determines whether the direction change exceeds a threshold (e.g., 100 degrees). Once the direction change has exceeded a threshold, at step 295 the monitor 50 preferably determines that a pass has been completed, e.g., by storing a value used by process 100 to determine that a pass completion condition has been met at step 135.

Figure 11:
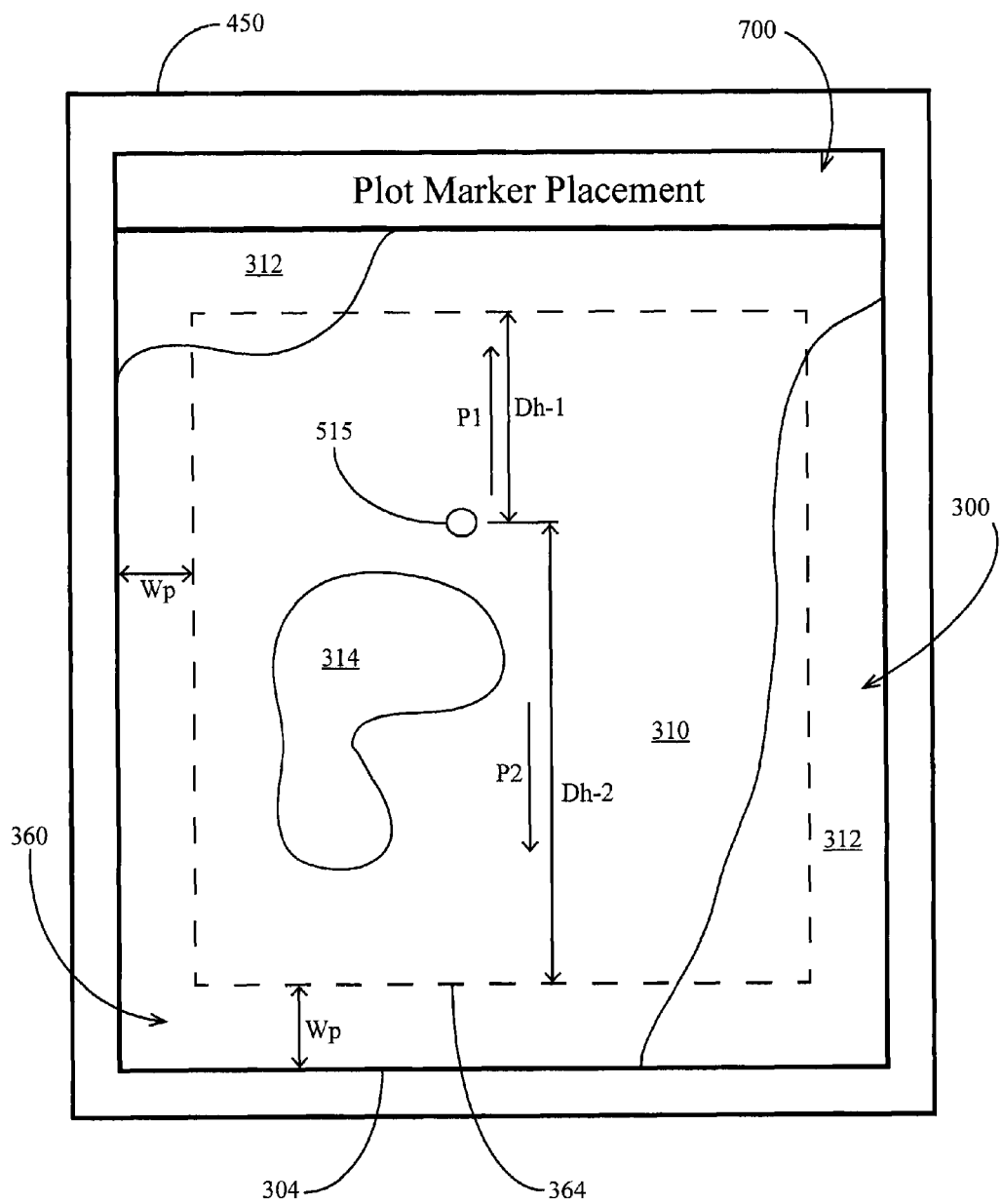
FIG. 11 illustrates an embodiment of a plot marker placement screen displaying a headland boundary.
Figure 12:
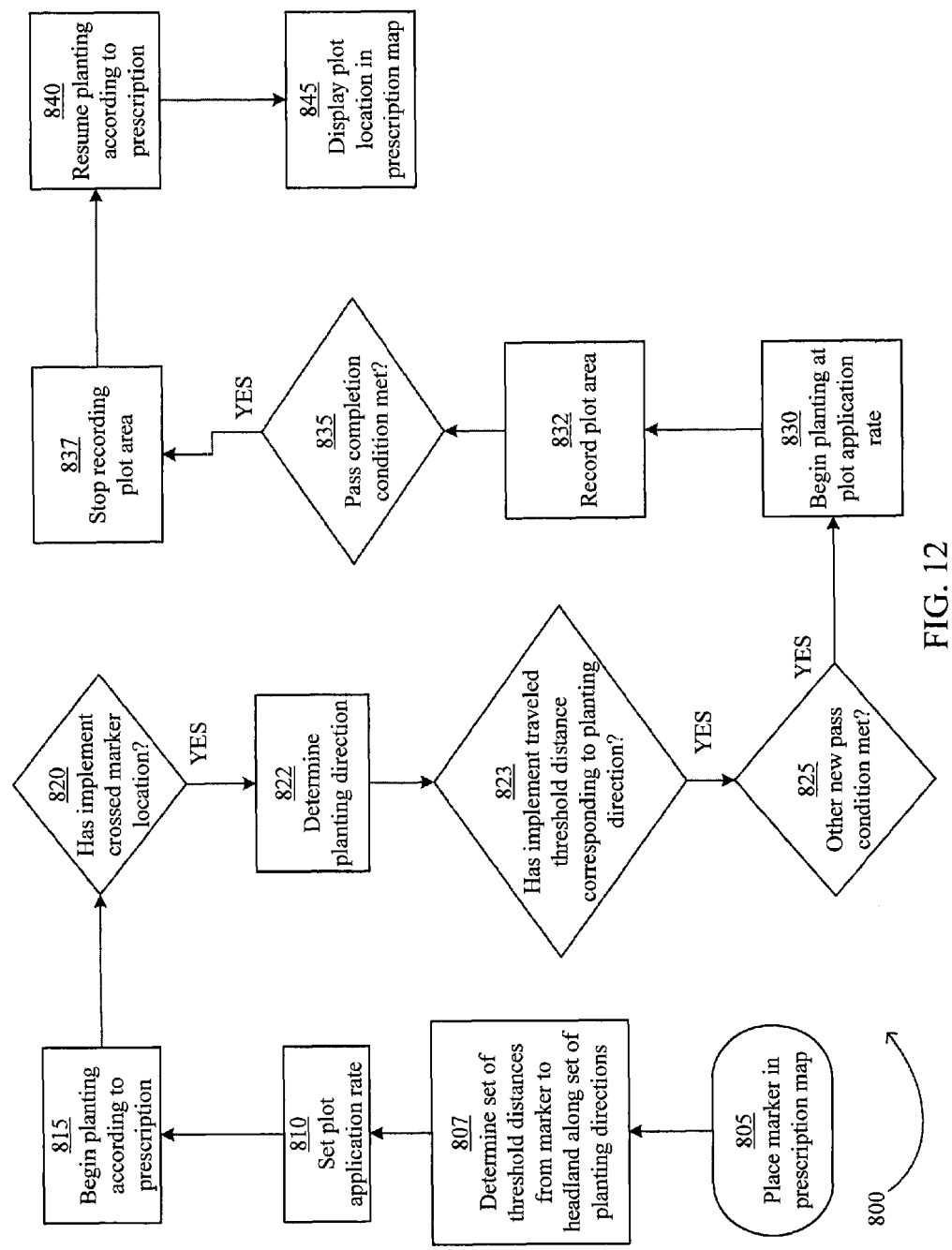
FIG. 12 illustrates another embodiment of a process for implementing a plot.

Referring to FIGS. 11 and 12, an alternative method of placing a plot based on a marker location is illustrated and described. As illustrated in FIG. 11, the user typically plants one or more headlands 360 around the perimeter of the field before planting the remainder of the field. Because the headland 360 is planted by a circumferential pass around the perimeter of the field, the headland has an inner boundary 364 separated from the field boundary 304 by the planter width Wp. The user preferably enters the planter width Wp into the memory of the monitor 50 during a setup phase. As illustrated, the monitor preferably displays an estimated headland inner boundary 364 based on the planter width Wp.

Turning to FIG. 12, a process 800 for placing a plot based on the distance from a marker to a headland is illustrated. At step 805, the monitor 50 preferably prompts and enables the user to place the marker 515 on the prescription map 300 as described above. At step 807, the monitor 50 preferably determines a set of distances from the marker 515 to the headland inner boundary 364 along a set of planting directions. By way of example, FIG. 11 illustrates a first distance Dh-1 along a first direction P1 and a second distance Dh-2 along a second direction P2. At step 810, the monitor 50 preferably prompts and enables the user to enter a plot application rate as described above. At step 815, the user preferably begins planting and the monitor 50 commands planting rates according to the prescription map 300. At step 820, the monitor 50 preferably determines whether the planter 10 has crossed the location of the marker 515. If the planter 10 has crossed the location of the marker 515, at step 822 the monitor preferably determines the planter direction and at step 823 determines whether the implement has traveled a minimum distance that was associated with that direction at step 807. Once the planter has traveled the minimum distance, at step 825 the monitor 50 preferably determines whether a new pass condition has been met, preferably using the process described herein with respect to FIG. 8. Once a new pass has been begun, at step 830 the monitor 50 preferably begins planting at the plot application rate and at step 832 records the area covered while planting at the plot application rate. At step 835, the monitor 50 preferably determines whether a pass completion condition has been met, preferably using the process described herein with respect to FIG. 9. Once a pass completion condition step has been met, at step 837 the monitor preferably stops recording the plot area and at step 840 resumes planting according to the prescription map 300. At stop 845 the monitor 50 preferably displays the recorded plot area on an as-applied map as described herein with respect to FIG. 10.

Figure 13:
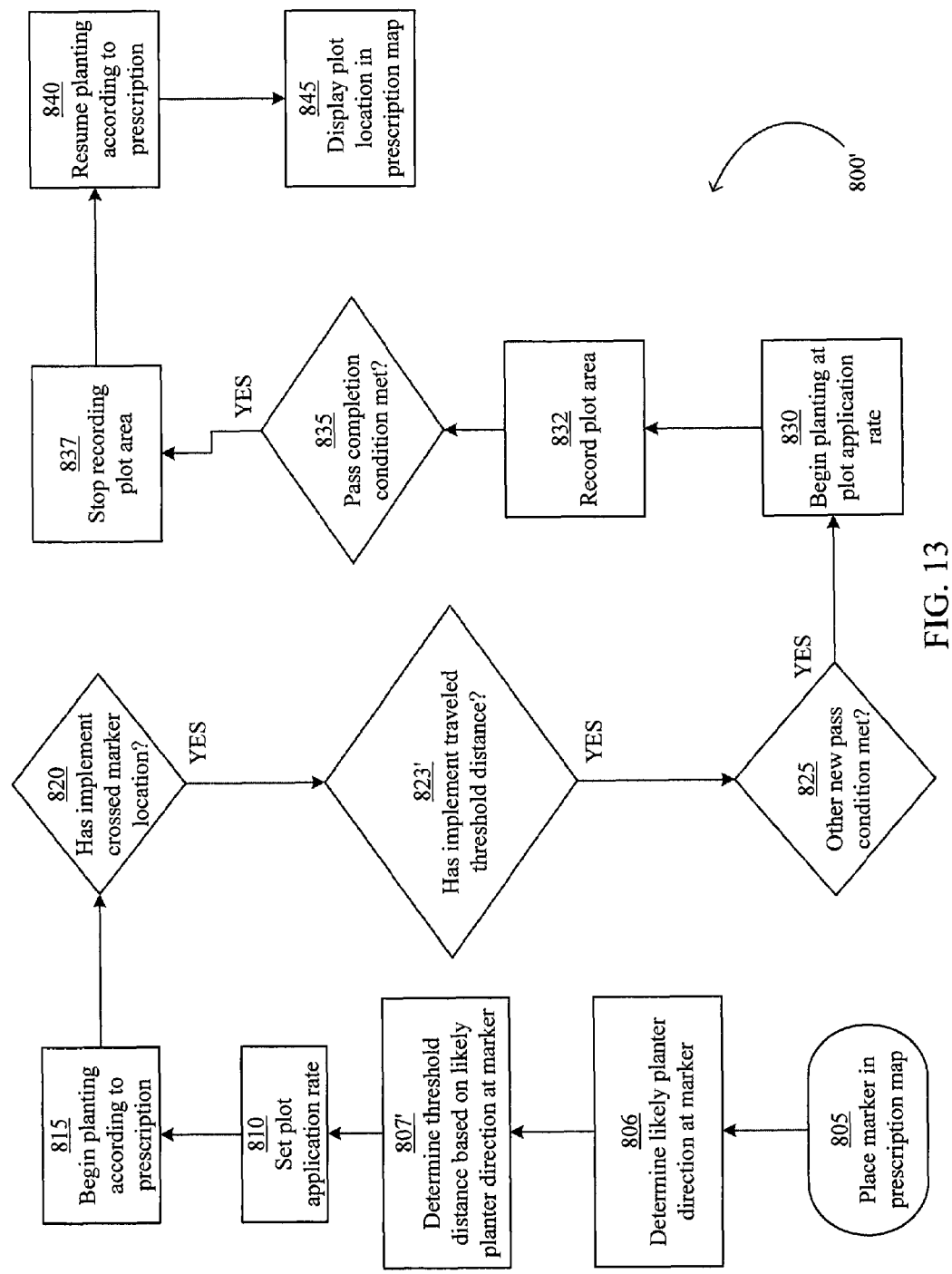
FIG. 13 illustrates still another embodiment of a process for implementing a plot.

Turning to FIG. 13, an alternative process 800' similar to the process 800 is illustrated. At step 806, the monitor 50 preferably determines a likely direction of the planter 10 when crossing the marker 515 (e.g., using a user-provided indication of likely direction or by accessing a file of recorded GPS coordinates recorded during prior field operations). At modified step 807', the monitor 50 preferably determines a threshold distance based on the likely planter direction. It should be appreciated that determining the planting direction is unnecessary in process 800. At modified step 823', the monitor 50 determines whether the implement has traveled the threshold distance. It should be appreciated that like-numbered steps of process 800' are substantially similar to the steps described herein with respect to process 800.

Although the systems and methods disclosed herein are illustrated and described with respect to the rate at which seeds are planted, in other embodiments the same systems and methods are be applied to other crop inputs applied using variable application implements other than planters. For example, in some embodiments the rate at which liquid fertilizer is applied using a variable rate application system is varied and the resulting yields are obtained after harvesting using the methods presented herein. In other embodiments, a system for planting different seed varieties during planting (e.g., those systems disclosed in U.S. Pat. Nos. 5,915,313 and 7,418,908, the disclosures of which are hereby incorporated herein in their entirety by reference) could be used to plant plots of different varieties using the methods presented herein.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A method for generating a plot in a field during a crop input application operation using a variable application implement, comprising:
   displaying a geo-referenced map of the field;
   prompting a user to select a marker location on said map, said marker location corresponding to at least one geo-referenced location in the field;
   initiating the crop input application operation using the variable application implement;
   applying a crop input on a first portion of the field at varying application rates according to a prescription map, said prescription map associating each of a plurality of regions in the field with one of a plurality of application rates; and
   implementing a plot in the field, said plot defining a plot region within the field, said plot region being selected during the crop input application operation based on said marker location.

2. The method of claim 1, wherein said prescription map calls for at least one prescription application rate within said plot region, wherein said crop input is applied at a plot application rate within said plot region, said plot application rate being different than said at least one prescription application rate, said plot application rate being determined prior to said crop input application operation.

3. The method of claim 2, further including:
   completing said plot;
   exiting said plot region; and
   applying said crop input to a remainder of the field at varying application rates according to said prescription map.

4. The method of claim 3, further including:
   storing a boundary of said plot region in memory.

5. The method of claim 4, further including:
   storing a modified prescription map in memory, said modified prescription map including said plot region; and
   displaying said modified prescription map to the user.

6. The method of claim 3, further including:
   defining a leading edge of said plot region by the ordered steps of:
      comparing a position of the implement to said marker location;
      determining that the implement has passed over said marker location;
      determining whether a new pass condition has been met; and
      beginning application at said plot application rate after said new pass condition has been met.

7. The method of claim 6, wherein said step of determining whether a new pass condition has been met includes determining whether the implement has stopped applying said crop input.

8. The method of claim 7, wherein said step of determining whether a new pass condition has been met includes:
   storing a first direction of the implement after the implement stops applying said crop input;
   determining that the implement has been lifted;
   determining that the implement has been lowered;
   determining a second direction of the implement after the implement has been lowered;
   comparing a change between said second direction and said first direction to a threshold; and
   storing a new pass determination if said change exceeds said threshold.

9. The method of claim 6, further including:
   defining a terminal edge of said plot region by the ordered steps of:
      determining whether a pass completion condition has been met;
      terminating application at said plot application rate after said new pass condition has been met; and
      resuming application according to said prescription map after said new pass condition has been met.

10. The method of claim 9, wherein said step of determining whether a pass completion condition has been met includes:
    determining whether the implement has been applying said crop input over a threshold distance after said new pass condition has been met.

11. The method of claim 9, wherein said step of determining whether a pass completion condition has been met includes:
    storing a first direction of the implement while the implement is applying said crop input;

determining that the implement has been lifted;
determining that the implement has been lowered;
determining a second direction of the implement after the implement has been lowered;
comparing a change between said second direction and said first direction to a threshold; and
storing a pass completion determination if said change exceeds said threshold.

12. The method of claim 6, further including:
determining a set of threshold distances from said marker location to a headland along a set of travel directions, said headland defining an implement-width boundary bordering the field;
comparing a location of the implement to said marker location;
determining that the implement has crossed the marker location;
determining the travel direction of the implement after crossing the marker location; and
determining that the implement has traveled a threshold distance corresponding to said travel direction.

13. The method of claim 12, further including:
defining a terminal edge of said plot region by the ordered steps of:
  determining whether a pass completion condition has been met;
  terminating application at said plot application rate after said new pass condition has been met; and
  resuming application according to said prescription map after said new pass condition has been met.

14. The method of claim 13, wherein said step of determining whether a pass completion condition has been met includes:
determining whether the implement has been applying said crop input over a threshold distance after said new pass condition has been met.

15. The method of claim 12, further including:
determining a likely implement travel direction at the marker location;
determining a threshold distance from said marker location to a headland along said likely travel direction, said headland defining an implement-width boundary bordering the field;
determining that the implement has crossed the marker location;
determining the travel direction of the implement after crossing the marker location; and
determining that the implement has traveled a threshold distance corresponding to said travel direction.

\* \* \* \* \*